(No Model.)
W. DAVY & J. W. CHANEY.
DRAFT EQUALIZER.
No. 455,312. Patented July 7, 1891.
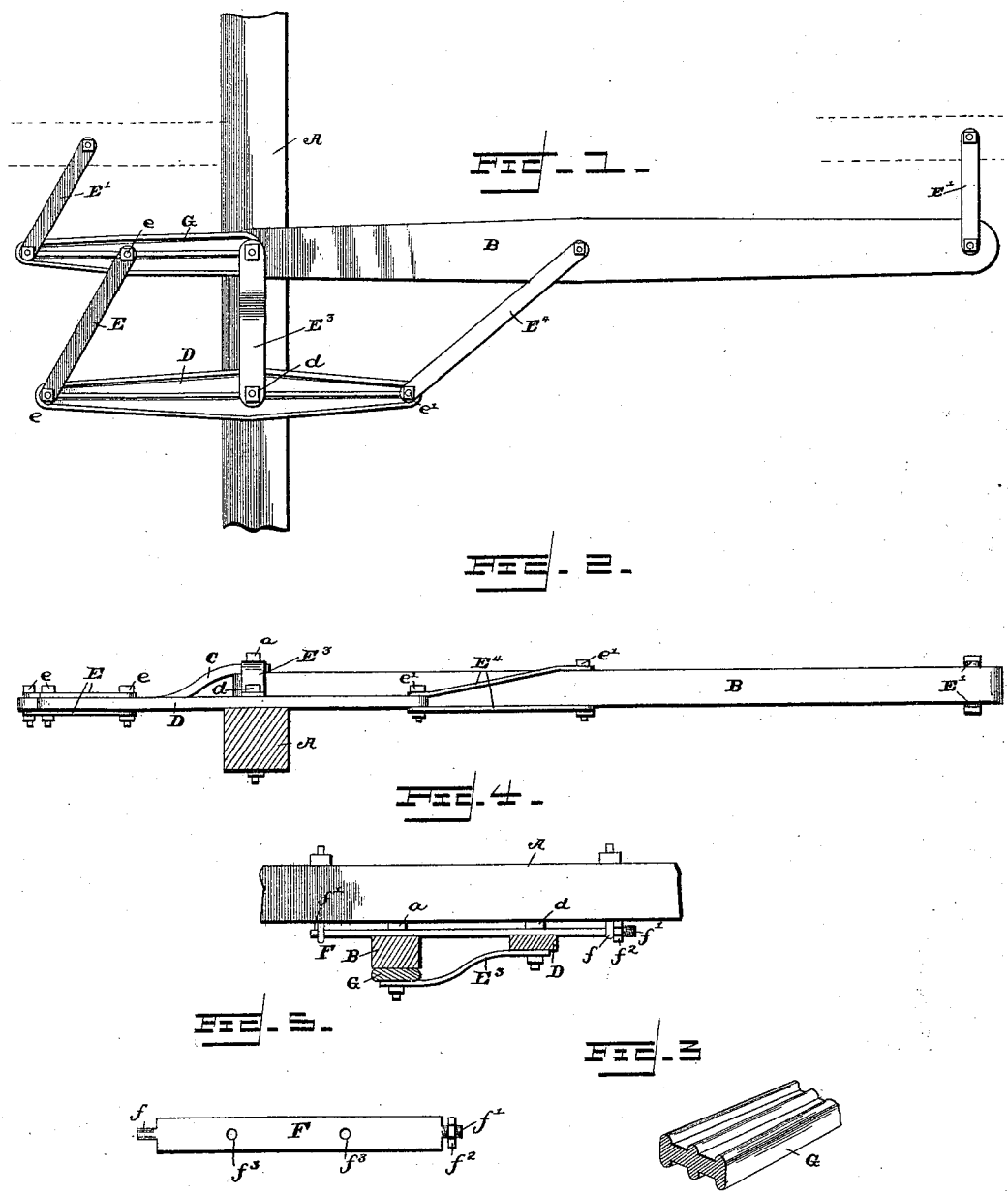
Witnesses:
E. S. Duvall Jr.
W. S. Duvall.
Inventors.
William Davy, and
James W. Chaney.
By his Attorneys, C. A. Snow & Co.

UNITED STATES PATENT OFFICE.

WILLIAM DAVEY AND JAMES W. CHANEY, OF WINFIELD, KANSAS.

DRAFT-EQUALIZER.

SPECIFICATION forming part of Letters Patent No. 455,312, dated July 7, 1891.

Application filed January 16, 1891. Serial No. 377,986. (No model.)

*To all whom it may concern:*

Be it known that we, WILLIAM DAVEY and JAMES W. CHANEY, both being citizens of the United States, and each residing at Winfield, in the county of Cowley and State of Kansas, have jointly invented a new and useful Four-Horse Evener or Doubletree, of which the following is a specification.

Our invention relates to improvements in four-horse eveners or doubletrees, to be used on harvesting-machines or sulky-plows, and to be especially useful for working four horses abreast where there is room on one side of the tongue or center of draft (either right or left) for only one horse, and have the other three on the other side of the tongue or center of draft.

The objects of our improvement or invention are, first, to provide a four-horse evener so that one horse may be placed on one side of the tongue or center of draft of the harvester or plow and three on the other, as above stated, so as to avoid having one horse walk in the grain when attached to a harvester, and so as to avoid one horse walking on the ground already broken by the plow when attached to a plow, and, second, by giving a center draft and making the draft equal for each of the four horses attached, and third, to have a four-horse evener self-adjustable, so that the draft will be the same, although one team may be somewhat in advance of the other. We attain these objects by the mechanism illustrated in the accompanying drawings, in which—

Figure 1 is a plan view of the entire evener or invention. Fig. 2 is a rear horizontal view of the evener, and is intended especially to show the thickness of the short lever. Fig. 3 is a section of one of said levers. Fig. 4 shows the manner of attaching the same to a sulky-plow with a straight beam. Fig. 5 shows the attachment placed on a sulky-plow, which answers for a tongue in a harvesting-machine.

Like letters of reference indicate like parts in all the figures of the drawings.

A designates the draft-beam of a harvester, and to the same, by means of a bolt $a$, is pivoted a transverse equalizing-beam B, said beam being pivoted at its inner end to the beam, and provided at its free end with a link E', to which may be connected the usual draft connections. The bolt $a$ also serves to pivotally connect to the beam A and the equalizing-beam B a short lever G, carrying at its free end draft-links E'. In rear of the beam B there is pivoted at $d$ to the beam A a beam D, the same extending at opposite sides of the draft-beam A. The bolts $a$ and $d$ are connected by means of a strap or link $E^3$, while the outer and inner ends of the beam D are connected, respectively, to the centers of lever G and beam B by means of pairs of links E and $E^4$, respectively, bolted at $e$ and $e'$.

In Fig. 4 we have illustrated the device applied to the under side of the draft-beam A of a cultivator. Eyebolts $f$ depend through perforations in the beam, and the eyes of the bolts receive the reduced ends $f'$ of a supporting-bar F, one of said ends being provided with a nut $f^2$. The bar F is provided with a pair of perforations $f^3$, and through the same pass the bolts $a$ and $d$. The bolt $a$ serves to pivot the beam B and lever G, together with the link $E^3$, to the bar F, and the bolt $d$ serves to pivot the link $E^3$ and lever D to the bar F.

With the above construction we obtain the advantages heretofore set forth as the objects of our invention.

In practice we employ hard wood in constructing the beam B, and light metal for the straps E to $E^4$, inclusive, and for the levers D and G we prefer to employ channel-iron, as shown.

Having described our invention, what we claim is—

The combination of the draft-beam A, the bolts $f$, passing through the beam and terminating at their lower ends in eyes, and the bar F, reduced at its ends to form bearing $f'$ for entering the eyes, the nut $F^2$ of the bolts $a$ $d$, the main beam B, mounted upon the bolt $a$, and the lever G oppositely disposed and also mounted thereon, the links E' at the extremities of the beam B and lever G, the lever D, mounted on the bolt $d$, the link $E^3$, connecting the bolts $a$ $d$, the links $E^4$, pivoted to the outer end of the lever D and to the center of the lever G, and the links E, pivoted to the center of the beam B and to the inner end of the lever D, substantially as specified.

WILLIAM DAVEY.
JAMES W. CHANEY.

Witnesses:
ALBERT B. TAYLOR,
HOPKINS SHIVVERS.